United States Patent [19]

Allezard

[11] 4,208,659
[45] Jun. 17, 1980

[54] SYSTEM FOR USE IN AN AIRCRAFT FOR OBSTACLE DETECTION

[75] Inventor: Roland Allezard, Verrières le Buisson, France

[73] Assignee: U.S. Philips Corporation, New York, N.Y.

[21] Appl. No.: 956,766

[22] Filed: Nov. 1, 1978

[30] Foreign Application Priority Data

Nov. 10, 1977 [FR] France .................. 77 33911

[51] Int. Cl.² .................................... G01S 9/24
[52] U.S. Cl. .......................... 343/14; 343/5 SA; 343/9 R
[58] Field of Search ........................ 343/14, 5 SA

[56] References Cited
U.S. PATENT DOCUMENTS

| | | | |
|---|---|---|---|
| 3,187,328 | 6/1965 | Vetter | 343/7 ED |
| 3,603,990 | 9/1971 | Poirier | 343/5 SA |
| 3,720,949 | 3/1973 | Richter | 343/14 |

*Primary Examiner*—Maynard R. Wilbur
*Assistant Examiner*—Richard E. Berger
*Attorney, Agent, or Firm*—Algy Tamoshunas

[57] ABSTRACT

This detection system of the radar type transmits a sawtooth-shaped frequency-modulated centimeter wave. The wave reflected by an obstacle, if any, is received by two fixed receiving antennas, each of these receiving antennas being connected to a circuit for processing the received signal. The phase shift between the waves is a measure for the angle $\theta$ formed between the path of flight of the aircraft and the straight line which connects the aircraft with the obstacle. Said phase shift is analyzed in an output circuit of the detection device which also comprises a control loop for controlling the amplitude of the beat-frequency signal between the transmitted signal and the received signal, a synthesizing circuit for a signal fan creating a range window by demodulation of the beat-frequency signal by means of the synthesized signal, a Doppler effect tracking loop and a circuit for analyzing the leading edge of the Doppler effect in the demodulated and filtered signal. In the case of an obstacle which is substantially directly in the direction of flight, last-mentioned circuit produces an information which possibly evaluates the information with respect to the angle $\theta$ and which is already present in the output circuit, in response whereto an alarm circuit becomes operative.

1 Claim, 3 Drawing Figures

SYSTEM FOR USE IN AN AIRCRAFT FOR OBSTACLE DETECTION

The invention relates to a system for use in an aircraft for the detection of obstacles. The system is of the CW-radar type and comprises a generator, connected to a fixed transmitting antenna, for generating a frequency-modulated high frequency signal, a first fixed receiving antenna, first means for producing a beat-frequency signal between the transmitted signal and the received signal, an output circuit and an alarm circuit.

It is an object of the invention to provide a simple, reliable, compact airborne radar system for detecting obstacles which is provided with fixed, stationary antennas and which generates an alarm signal if there is an obstacle in the path of the aircraft at a distance of, for example, two kilometers. Such a system must be immune to parasitic obstacles, such as a hail storm or clouds and at the same time have sufficient sensitivity to detect small obstacles, such as, for example, an electric cable, a factory chimney stack and the like.

In addition to the above elements, the system of the invention further comprises a second fixed receiving antenna, second means for generating a second beat-frequency signal between the signal received by the second receiving antenna and the transmitted signal. The two receiving antennas are located at a predetermined distance from each other and each is connected to a signal processing circuit. The processing circuits are of identical construction and there respective outputs are connected to the previously mentioned outputs circuit through a first amplifier. The system further includes means for standardizing the amplitude of the beat-frequency signal, means for amplitude demodulation of the amplitude-standardized signal by means of a signal whose frequency is derived from the transmitted signal and is representative of the predetermined distance, means for controlling the maximum value of the frequency of the demodulated signal, and also a frequency analyser for analysing the shape of the envelope of the spectrum of the output signal of at least one of the processing circuits. The output of the analyser is connected to a second input of the output circuit.

The invention will now be further explained with reference to the accompanying drawing wherein.

Figure 1:
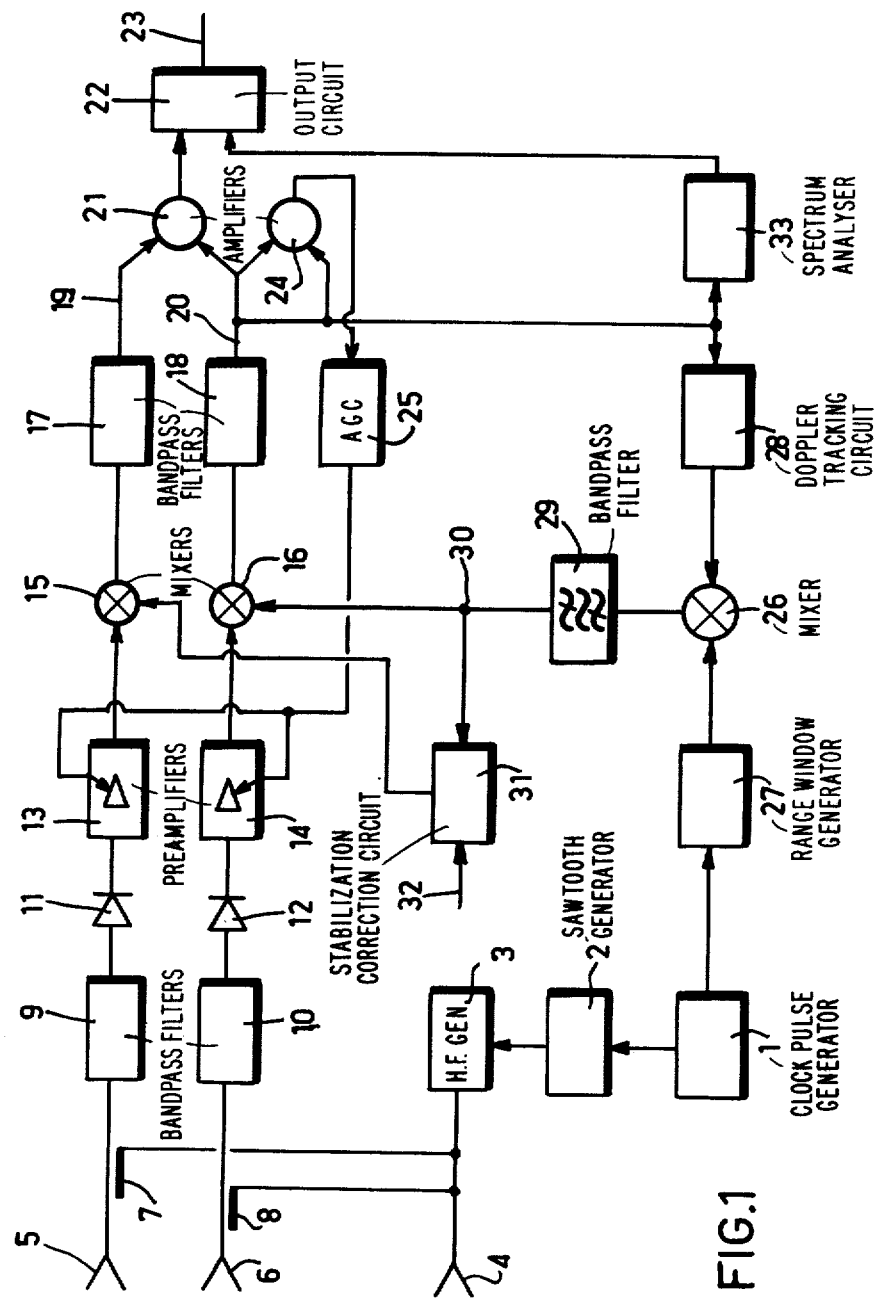
FIG. 1 is a block diagram of the system according to the invention.

The system shown in FIG. 1 comprises a transmission circuit for the high-frequency signal formed by the cascade arrangement of a clock pulse generator 1, a sawtooth generator 2, a high-frequency signal generator 3 and a transmitting antenna 4.

The generator 1 supplies pulses of a fixed frequency $Fr=1/Tr$. These pulses, transferred to the generator 2, produce in this generator a sawtooth signal whose "sawtooth waveforms" are preferably asymmetrical. In the further coarse of this description, it is assumed that each sawtooth decreases linearly with time. The sawtooth signal controls the generator 3 so that a frequency modulation is the result. The transmitted, frequency-modulated signal has a center frequency F of approximately 4 GHz (centimeter waves). The amplitude of the modulation frequency $\Delta F$ is approximately 1.5 MHz, whereas the repetition frequency of the sawteeth is approximately 20 kHz. The small-size antenna 4 is a fixed, weakly directional antenna which points to the front of the aircraft.

The system according to FIG. 1 also comprises first and second circuits for processing the received signal, which is an echo signal resulting, from the reflection of the transmitted signal by an obstacle (or by several obstacles) in the direction of flight of the aircraft. Each processing circuit comprises the following, interconnected elements, in the following sequence: a receiving antenna 5 (or 6), a coupling device 7 (or 8), a bandpass filter 9 (or 10), a diode 11 (or 12), a preamplifier 13 (or 14), a frequency mixing stage 15 (or 16), a low-pass filter 17 (or 18) whose output is denoted by 19 (or 20). An amplifier 21 is connected to the outputs 19 and 20 of the two circuits, and supplies an output signal to an output circuit 22. Just as the transmitting antenna, the receiving antennas 5 and 6 are also mounted in the front of the aircraft. By means of the coupling devices 7, 8, it is possible to superimpose the local oscillation signal, formed by the transmitted signal, on the signal received by each receiving antennas 5, 6. The electric length of the coupling lines which connect the coupling devices 7, 8 to the transmitting antenna differs by a quarter wavelength ($\lambda/4$) from the wavelength of the transmitted wave, so that the signals at the inputs of the filters 9, 10 are shifted approximately 90° relative to each other. Filters 9 and 10 are high-frequency filters for eliminating any interference signals produced by, for example, other radar systems which transmit signals and frequencies outside the operating band of the system of the invention. The diodes 11, 12 mix the received signal with the transmitted signal and produce a beat-frequency signal of the frequency $fb_1$, $fb_2$, respectively, where $fb_1 = fb_2.1$ The frequency spectrum of this signal is exclusively by equidistant spectral lines of the frequency Fr. Each spectral line has a frequency which is a multiple of the frequency Fr, increased or decreased by the Doppler frequency.

The beat-frequency signal can therefore be attributed to the Doppler effect, which is representative of the relative speed, as well as to the distance effect, wherein the number of each spectral line of the spectrum is associated with a given distance in front of the aircraft, the distance being the greater as the number of the spectral line is higher. The spectrum of each beat-frequency signal has a maximum energy at the frequency component corresponding to the distance to the obstacle. In general this maximum energy content occurs at two or three adjacent spectral lines of the spectrum, which means that the obstacle is some hundred of metres long. The preamplifiers 13 and 14 are identical and their function is to automatically compensate for variations in the level of the received signal, the variations being produced, in particular, by the surface of the obstacle. As described hereinafter, the signal level control is obtained by means of a control loop. The passband of the preamplifiers corresponds to the range of the distances to be monitored. The passband extends for example, over 50 kHz and is centered around a frequency of approximately 400 kHz.

The signal applied to the frequency mixing stages 15, 16 are multiplied by one another in these stages. The filters 17, 18 have a fixed passband of some kHz and are arranged to suppress the high-frequency component of the output filter of the mixing stages 15, 16. Both circuits have amplifier 21 in common. The function of amplifier 21 is to clearly reveal a phase difference between the output signals of these circuits. Since both processing circuits operate at high frequencies, it should be noted that the phase shifts introduced at different points between the two circuits by the receiving antennas, coupling devices, and, possibly, frequency mixing stages are added algebraically and retained up to the output of said circuits, which is extremely important as will be explained in the section "operation of the system".

In addition to the circuit for transmitting the high-frequency signal and the first and second circuits for processing the received signal, the system also comprises a control loop for controlling the amplitude of the beat-frequency signals, a circuit for synthesizing a signal, a "Doppler effect tracking loop ", a circuit for analysing the leading edge of the Doppler effect, and the output circuit 22 whose output 23 produces a logic signal, if necessary, triggers an alarm circit, not shown, producing for example, a visual or audio alarm signal.

The output of one of the two circuits for processing the received signal, for example the output 20, is connected to two inputs of an amplifier 24, whose output is connected to the common gain control input of the preamplifiers 13 and 14 through an automatic gain control circuit 25. This assembly forms the loop for controlling the amplitude of the beat-frequency signal.

The signal synthetising circuit also comprises the clock pulse generator 1 which is connected to a mixing stage 26 through a range window signal generator 27. Generator 27 is of a known type and generates a signal whose frequency spectrum is limited to one spectral line or to several adjacent spectral lines, the frequencies of these lines being equal to integral multiples of the frequency Fr. Depending on the nature of a possible obstacle and the desired precision of the system, the signal applied to the mixing stages 15, 16 can be formed for example, by one one spectral line.

The Doppler effect tracking loop is formed by the cascade arrangement of the output of one of the filters 17, 18, for example, the output 20 of filter 18, a Doppler tracking circuit 28, the frequency mixing stage 26 a second input of which receives the output signal of the circuit 27 and a bandpass filter 29 connected to the output of the mixing stage 26. The output of filter 29 is connected directly to an input of the mixing stage 16 and to an input of the mixing stage 15 through a stabilization correction circuit 31.

Circuit 31 shifts the phase of the beat-frequency signal over a positive or negative angle in dependence on the circuit influenced by the beat-frequency signal, the value of the angle being representative of the stabilization angle of the aircraft.

The output 20 is also connected to a spectrum analyser 33. Depending on the form of the applied spectrum, analyser 33, supplies a signal which characterizes certain properties of the frequency spectrum of the signal produced at the output 20, to a second input of the circuit 22.

OPERATION OF THE SYSTEM

The object of the system is to produce an alarm signal when an obstacle is detected directly in the flight path of the aircraft at a predetermined range. The system is capable of "selecting" an obstacle in an enclosed volume in front of the aircraft. It is, however, "blind" to and is not perturbed by any other obstacle located outside that volume. The sensitivity of the system to an obstacle present in the enclosed volume depends on the relative speed with which the aircraft moves towards the obstacle. This is manifested by the particular form of the spectrum of the beat-frequency signal having the frequency $fb_1$ or $fb_2$ at the output of the diodes 11 and 12. The enclosed volume is limited by the surfaces of two spherical segments having a predetermined radius and whose centres coincide with the aircraft, as well as by a conical surface whose axis coincides with the axis of the aircraft and whose peak coincides with the antennas of the system. The space thus defined has already been denoted as a "range window" and is realized by the synthesizing circuit formed by the components 1, 27, 26, 29, 30, 16 and 31, 15, respectively. The main function of the processing circuits is to analyse the phase shifts between the waves received by the two antennas 5, 6. This phase shift is a measure of the bearing to the obstacle, i.e. the angle between the direction of flight of the aircraft—obstacle and the plane of flight or the horizontal plane. The form of the spectrum of the received signal is now co-determined by the direction of flight-obstacle and the resultant Doppler shift, as well as by the nature of the obstacle itself. This spectrum is analyzed by the circuit 33.

The function of the control loop is to control the amplitude of the received signal and the Doppler tracking loop serves to standardize the amplitude and the maximum frequency, respectively, of the output signals of the multipliers 21 and 24.

For the system to function as described above and to obtain a stable operation which is not easily disturbed and, in addition, is sufficiently sensitive, a choice must be made as regards the values or the range of values of the parameters occurring in operation.

Firstly, the transmitted wave is a centimetre wave, which means a frequency F to of the order of some Gigahertz. The frequency F=4.28 GHz is, for example, chosen as the center frequency of the high-frequency signal generator 3, that is to say a wavelength $\lambda = 7$ cm.

The repetition frequency, Fr, of the sawteeth is now chosen so that no ambiguity is possible between the two frequencies: $(m+1)Fr-(mFr+Fd\ max)$ and $(m\ Fr+Fd\ max)-m\ Fr$; where in m is an integer and Fd max the highest Doppler frequency the system is capable of detecting. This Doppler frequency Fd max must be at all times smaller than Fr. More particularly it must hold that $$Fr > 2Fd\ max \qquad (1)$$

The value Fd max is produced if an obstacle is exactly in the flight path of the aircraft, the aircraft has its maximum speed and the obstacle is stationary. Fd max increases when the obstacle travels at its maximum speed towards the aircraft. The capabilities of the aircraft and the highest possible speed Va being known, the value of Fr can be determined from (1). For example, assuming that Va=278 metres per second, Fd max=2 Va/λ=7936 Hz, then 20 kHz can be taken for Fr.

An other variable is the width of the range window, that is to say the distance between the two circle segments defined above. This range window is fully determined by the choice of a number of adjacent frequency components produced by the generator 27 and by the value of the modulation frequency Fr. It is possible to realize a range window for a FM-radar system by demodulating the received signal with a harmonic signal whose frequency is equal to the modulation frequency, so in our case equal to Fr. In the system of FIG. 1 this demodulation is performed in the mixing stages 15 and 16 with the output signal of the generator 27 whose frequency was shifted in the frequency mixing stage 26. The relation between the difference in the transmitted and the received frequency and the range to the obstacle is given by:

$$F_{di} = \frac{2 \Delta F}{Tr \cdot c} \cdot d \qquad (2)$$

c is the propagation velocity of an electromagnetic wave, d is a obstacle-to-aircraft distance, and $F_{di}$ is a frequency related to said distance d.

When a demodulation by means of three spectral lines is opted for, the radii $r_1$ and $r_2$ of the two spherical segments are determined by the two outermost spectral lines. It then follows from (2) that:

$$r_1 = \frac{Tr \cdot c}{2 \Delta F} \cdot (n + 1) Fr, \qquad (3)$$

and $$r_2 = \frac{Tr \cdot c}{2 \Delta F} \cdot (n - 1) Fr, \qquad (4)$$

wherein n denotes the number of the central spectral line.

It now follows from the relations (3) and (4) that:

$$r_1 - r_2 = \frac{c}{\Delta F} \qquad (5)$$

Starting from demodulation by means of two spectral lines, it holds that $$r_1 - r_2 = \frac{c}{2 \Delta F} \qquad (6)$$

If a width of the range window of, for example, $r_1 - r_2 = 200$ m is desired and it is assumed that the demodulation of the received signal is performed with three frequency components, it follows from expression (5) that:

$$\Delta F = \frac{c}{r_1 - r_2} = 1.5 \text{ MHz}$$

The radius r of this range window depends further only on the ordinal number of the central spectral line. The radius r can therefore, be computed from the formulae (3) and (4):

$$r = \frac{Tr \cdot c}{2 \Delta F} \cdot n Fr,$$

wherein n must, of necessity, be an integer.

If r must be approximately 2 Km, the value n becomes equal to:

$$r = \frac{2 \Delta F \cdot r}{r} = 20.$$

To simplify design, the antennas are fixed and broadly directive. The fixed arrangement of the antennas allows the detection of the path length difference between the wave which is incident on one antenna and the wave which is indicent on the other antenna. When the angle formed between, on the one hand, the direction of flight-obstacle and the flight plane, on the other hand, is denoted by $\theta$ and if it is assumed for clearness of the explanation that only a punctiform obstacle is involved which is present in the range window, the path length difference $\Delta z$ between the two incident waves satisfies the formula:

$$\Delta z = x \sin \theta \qquad (7)$$

where the value x, which is a positive value, denotes the distance between the two subjacent receiving antennas perpendicularly to the plane of the aircraft. The path length difference corresponds to a phase shift $2 \Delta \phi$ between the signal transferred by the receiving antennas, so that $$2 \Delta \phi = \frac{\Delta z}{\lambda} \cdot 2\pi \qquad (8)$$

It should be noted that this phase shift can be either positive or negative, depending on whether the angle $\theta$ itself is positive (obstacle above the plane of flight) or negative (obstacle below the plane of flight). A suitable choice of x relative to $\lambda$ must result in an unambiguous relation between the angle $2 \Delta \phi$ and $\theta$, so that the value of $\theta$ remains limited to a maximum value $\theta$ max whose absolute value to below $\pi/2$, and for which it can furthermore be assumed that in response to any obstacle detected by the detection device such a Doppler frequency spectrum is obtained that no alarm signal can be produced. Taking the above into account, it is assumed that $|2 \Delta \phi| = \pi/2$ for $\theta = \theta$ max. In accordance with the formulae (7) and (8) this results in the following relation:

$$\frac{\pi}{2} = \frac{x \sin |\theta \max|}{\lambda} \cdot 2\pi, \text{ so that}$$

$$x = \frac{\lambda}{4} \cdot \frac{1}{\sin |\theta \max|}.$$

For example, for $|\theta \max| = \pi/6$, x becomes equal to $\lambda/2$, which for a value of $\lambda = 7$ cm, taken here by way of example, this means that:
$x = 3.5$ cm.

As mentioned earlier in this description a phase shift of $\pi/2$ (phase shift between the coupling devices 7 and 8) is added to the phase $2 \Delta \phi$. In response thereto, signals of the form:

$$A \sin (2\pi F d_1 t + 2\Delta\phi + \pi/2) = A \cos (2\pi F d_1 t + 2\Delta\phi),$$

and $$A \sin (2\pi F d_1 t).$$

are now produced at the outputs 19 and 20 of the filters 17 and 18. In these expressions A denotes the standardized maximum amplitude of the signal, whereas $Fd_1$ denotes a substantially constant low frequency, which will be defined in greater detail hereinafter, of approximately some kilohertz.

By shifting the point of origin of $\Delta \phi$ the following expressions are obtained:

$$A \cos (2 \pi F d_1 t + \Delta\phi).$$

and $$A \sin (2\pi F d_1 t - \Delta\phi).$$

The product of these two output signals is:

$$\frac{A^2}{2} \sin 4\pi Fd_1 t - \frac{A^2}{2} \sin (2\Delta\phi).$$

The average value of this function is $-\sin\Delta\phi$ or, in other words, $$-\sin\left(\frac{\pi}{2} \frac{\sin\theta}{\sin|\theta \max|}\right).$$

For low values of $\theta$ this expression is approximately equal to $$-\sin\left(\frac{\pi}{2\sin|\theta \max|}\right)\theta.$$

This expression depends on $-\theta$, which makes it possible to distinguish between an obstacle above the plane of flight and an obstacle below the plane of flight.

The second term $A^2/2 \sin (4\pi Fd_1 t)$, having a much higher frequency and occurring as an oscillation on either side of the $-A^2/2 \sin 2\Delta\phi$ curve, is filtered off out in circuit 22.

The maximum amplitude A of the signal is standardized by the loop 20, 24, 25 and 13, 14, respectively. To that end the output signal of the multiplier 24 is, in the most simple case, equal to $A^2\sin^2(2\pi Fd_1 t)$. The amplitude of this signal is proportional to $A^2$. In the circuit 25 this amplitude is utilized for the generation of a signal whose level decreases linearly versus $A^2$. This last-mentioned signal controls in a conventional manner the gain of the preamplifiers 13 and 14. Circuit 25 thus operates as a discriminator. It is advantageous to allot a low value to $\theta$ max; the system then has a correspondingly higher sensitivity for determining whether the obstacle is in a position above or below the altitude of the aircraft. This optimalisation criterium is dependent on the optimalisation criterium with respect to circuit 33, that is, the shape of the envelope of the signal spectrum characteristic of the received Doppler signal originating from the obstacle is likewise greatly dependent on the angles $\theta$ at which the different points of the obstacle which are "visible" from the aircraft and which are inside the range window are perceived (in the case of a non-punctiform obstacle). In dependence on the precision obtained in the analysis of said shape, it is possible to reduce the value $\theta$ max by a corresponding amount by altering the distance between the receiving antennas and/or the wavelength of the transmitted signal.

As regards the Doppler effect, the invention makes use of the property that the Doppler signal has a continuous frequency spectrum whose upper value is limited. In the system this highest value, Fd max, is produced at the lowest angular value $\theta$ in the range window. When an obstacle is directly in the line of flight $\theta = 0$. It should be noted that the value Fd max, chosen by the system, is only the highest value which corresponds to an angle $\theta$ at which a spectrum component is produced which cannot be ignored; that is to say, the amplitude can be detected by the frequency mixing stages 15 and 16. As a result when the spectrum has a gradually decreasing leading edge, a Doppler signal is present which is not equal to 0, although the amplitude of said signal is below a fixed value Fd max retained by the system. If, on the contrary, the spectrum has a "steep" leading edge, the value of Fd max does correspond to a maximum value of the received Doppler frequency. Since the velocity Va of the aircraft may have any value between certain limit velocities and a given aircraft-obstacle configuration and since the Doppler frequencies are proportional to velocity Va, the system according to the invention adjusts the value Fd max to a substantially constant value $Fd_1$ and it selects at a value below $Fd_1$ only a given percentage of the Doppler frequencies. The frequency of the whole Doppler frequency range being shifted over the same instantaneous value $|Fd_1-Fd \max|$. This frequency range is, for example, situated between 0.95 $Fd_1$ and $Fd_1$ and will be called the "leading edge" of the Doppler effect hereinafter, this edge being either "steep" (so clearly limited) or "soft" depending on the shape and the position of the obstacle relative to the aircraft. This frequency control is performed by the loop 20, 28, 26, 29, 30, 16 and 31, 15, respectively. This control has the advantage that the low-pass filters 17, 18 are simple. However, these filters must be accurately identical in order to avoid the introduction of parasitic relative phase shifts between the two circuits for processing the received signal. The filters can be accurately identical because of the fact that they have a fixed band as their passband due to the use of the frequency control loop. On the other hand, it is possible to chose the cut-off frequencies of the passband independently of the possible Doppler frequencies, it also being possible to chose them so that the cut off frequencies still satisfy other requirements. One of these requirements is that the output frequency $Fd_1$ must be relatively high so that the term $A^2/2 \sin (4\pi Fd_1 t)$ can be easily removed from the circuit 22 by filtering. A further requirement is that the frequencies associated with the passband must not be equal to the frequency of a harmonic of the repetition frequency of the sawtooth Fr. Another advantage of such frequency control is that the velocity Va of the aircraft must be known for a proper operation of the system. In accordance with an embodiment, not shown, of the detection system according to the invention, which may be of a less high precision, the elements 28, 26 and 29 of FIG. 1 are omitted, the output of the element 27 then being directly connected to the branch 30, the passband of the filters 17, 18 depending on Fd max, whereas in the circuit 33 the circuits for analysing the energy are likewise dependent on said frequency Fd max.

The frequency control loop of FIG. 1 operates in the following manner, the different frequency values being given for the sake of clearness according as the description progresses.

It is assumed that in normal flight conditions of the aircraft and for a stationary obstacle, the range of the possible Doppler frequencies extends from 1 KHz to 8 KHz (the velocity Va varies from 34.7 m/sec to 278 m/sec).

In view of the above-mentioned requirements regarding the passband of the filters 17 and 18, the passband is centered around, for example, the frequency value 20 KHz. Said passband is limited by, for example, the frequency value 29.33 KHz and 30.77 KHz. The maximum frequency of the signal $Fd_1$ at the outputs 19, 20 is kept between, for example, the values 30.4 KHz and 30.6 KHz. This variation at the input of the circuit 28 manifests itself in a variation in the opposite sense of a signal, transmitted by the circuit 28, having a single frequency $Fd_o$. This frequency $Fd_o$ is of such a character that for each value of $Fd_1$ between the above-mentioned cut-off frequencies the following relation holds:

$$Fd_o + Fd_{max} = Fd_1.$$

In the detection device a variation of $Fd_{max}$ means a variation in the opposite sense of approximately $Fd_o$, and this value $Fd_o$ is a substantially linearly decreasing function of $Fd_1$.

If $Fd_1$ varies, for example, from 30.4 KHz to 30.6 KHz, which corresponds to an increase in $Fd_{max}$ of 1 KHz to 8 KHz, the value $Fd_o$ falls from 29.4 KHz to 22.6 KHz. The output signal of the frequency mixing stage 26 contains the sum signal and the difference signal of the signals applied to the two outputs of stage 26. Since the system according to the invention utilizes only the spectral lines supplied by generator 27, which lines are shifted in the positive sense over the frequency $Fd_o$, the sole function of bandpass filter 29 is to pass the spectral line corresponding to said sum signal. For this purpose $Fd_o$ must be sfficiently high to ensure that even in the most unfavorable case in that respect, namely that there are three spectral lines at the output of the generator 27 and, moreover, the lowest value of $Fd_o$, the two spectral lines correspond to the sum signal and the difference signal, respectively. In addition, the width of the passband of the filter 29 is at least equal to the width of the output spectrum of the generator 27 increased by the possibly higher value of $Fd_o$. Fully in accordance with the digital example discussed previously, the passband may be situated between the frequencies 400 KHz and 470 KHz and the two above-mentioned conditions are satisfied.

It should be noted that shifting the signals of the two processing circuits over a frequency spacing $Fd_o$ can also be done directly, namely by connecting the output of the generator 27 directly to the branch 30 and the output of the circuit 28 directly to a frequency mixing stage provided between the frequency mixing stage 15 and 16, respectively, and the filter 17 and 18, respectively, said last filter being always followed by a bandpass filter which has the same function as filter 29.

The Doppler frequency control loop and, more particularly, the circuit 28 can be adjusted so that at a value below a minimum threshold value of $Fd_{max}$, for example $Fd_{max} = 1$ KHz, the value of $Fd_o$ remains constand and equal to a maximum value, for example 29.4 KHz. So from the value $Fd_{max} = 0$ there is no control any more for this Doppler frequency range but a simple frequency shift of the received signal and the signal at the outputs 19 and 20 can no longer be analysed by the circuit 30 owing to the excessive shift to lower frequencies of the upper portion of the frequency spectrum of the signal at the outputs 19, 20.

Figure 2A:
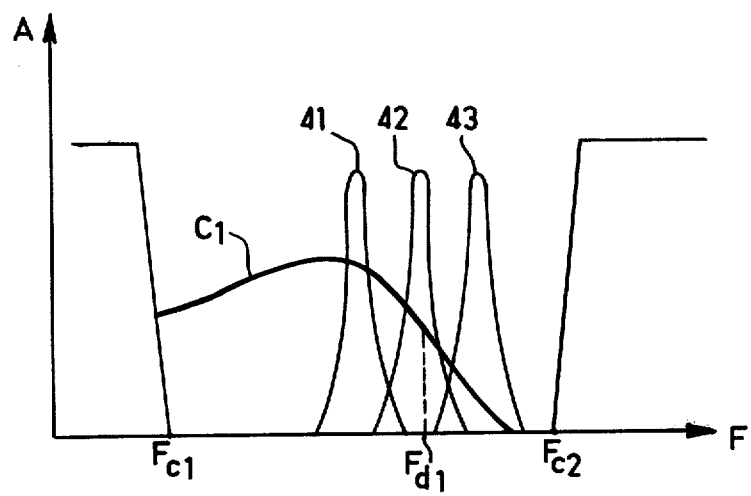
FIG. 2a and 2b shows the frequency spectra of output signals of a circuit for processing the received signal.
Figure 2B:
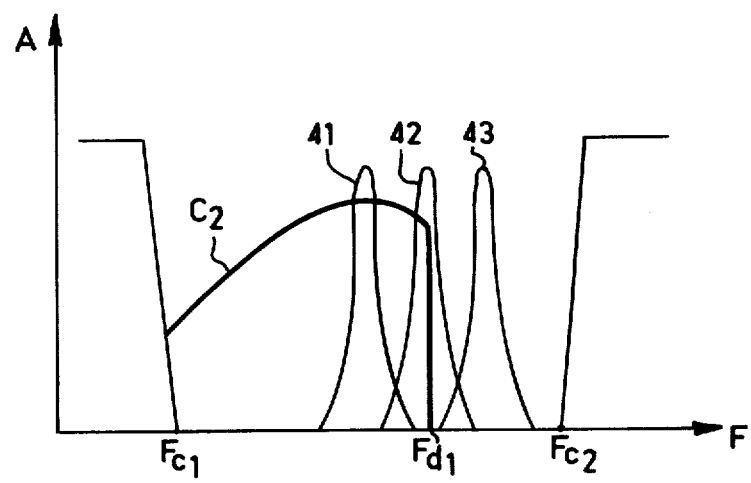

The operation of the spectrum analysing circuit 33 will now be described with reference to FIG. 2. In FIG. 2, the curve $c_1$ and $c_2$ show the spectrum of the output signal at the output 20, whereas $Fc_1$ denotes the lower cut-off frequency and $Fc_2$ the upper cut-off frequency of the filters 17 and 18. FIGS. 2a and 2b show the passband of three narrow-spectrum analysing filters 41, 42, 43. FIG. 2a illustrates the case where an obstacle is parallel to the plane of flight, the obstace being, for example, a flat stretch of open country when the aircraft is in horizontal flight. In that case a "soft" leading edge is produced. In this case it can be assumed, that if the aircraft flies sufficiently low, the output signal of the amplifier 21 may initiate an indication in the output circuit 22, for example, in the form of a logic signal "1", that there is an obstacle which, considered under a given accute angle, is located at a predetermined range in the direction of flight of the aircraft. It can also be assumed that the Doppler frequency control loop is functioning, which is manifest from the presence of curve $C_1$ of FIG. 2a, the value $Fd_1$ varying between, for example, 30.4 KHz and 30.6 KHz as in the preceding example. In this case, the circuit 33, which is actually an evaluation circuit for the signal received at the first input of the circuit 22, should not evaluate the first positive information which is directly derived from the two processing circuits for the received signal, since the obstacle detected in that manner is not a real obstacle and, consequently, the aircraft can continue its low-altitude flight without any risk. This is manifested by, for example, a logic circuit "0" at the output of the circuit 33, the circuit 32 comprising an AND-gate, not shown, which has a first output connected directly to the output of the circuit 33 and a second input of which receives the logic signal originating from the output signal analysing circuits of the amplifier 21, the logic signal "1" being present, in the case of FIG. 2a, at said second gate input.

In that case the AND-gate produces a logic signal "0" through its output which corresponds to the output 23 of the circuit 22. In the following description $W_1$ and $W_3$ denote the respective energies detected by the filters 41, 43. For obtaining the above-described desired result the ratio $W_3/W_1$ is realized by a known comparison circuit which forms part of the circuit 33, whereas, if said ratio $W_1/W_3$ is greater than the predetermined threshold voltage, for example 0.15, a second comparison circuit, which operates as a difference producer and is situated beyond the previously mentioned comparison circuit in the circuit 33 produces a logic signal "0" at its output which corresponds to the output of circuit 33.

FIG. 2b illustrates the case of an obstacle which is substantially in the direction of flight, meaning a steep leading edge in the Doppler spectrum: the curve $c_2$ is clearly limited at its maximum value $Fd_1$, which is particularly the case for an obstacle in the direction of flight situated above or below the altitude of the aircraft, the device for detecting the obstacle then receiving Doppler frequencies corresponding to a "maximum maximorum" at low angular values $\theta$, which can be positive as well as negative. In this case it holds that $$W_3/W_1 < 0.15$$

which results in a logic signal "1" at the output of said second comparison circuit, causing a logic "1" to be produced at the output 23 of the detection device in response to which the alarm circuit is made operative. The use of the filter 42 is optional. This filter can be utilized for a better distinction between the curves $c_1$ and $c_2$. The energies $W_1$, $W_2$, $W_3$ detected by the filters 41, 42, 43 respectively, can be considered as variable parameters of a suitably chosen function which is representative of the leading edge of the Doppler spectrum, the value of said function being compared, as previously, with a predetermined threshold value.

Other embodiments, not shown in the figure, of the system will now be described.

The system is not limited to an embodiment having three antennas. It is alternatively possible to use two antennas, namely by using circulators, the transmitting antenna then being constituted by one of the receiving antennas.

In accordance with a further embodiment it is possible to replace the amplfiers 21, 24 by simple frequency mixing stages 51, 54, not shown. When $V_1$ and $V_2$ denote the respective signals at the outputs 19 and 20, respectively, the output signal of the frequency mixing stage 51 contains the signals $(V_1-V_2)$ and $(V_1+V_2)$ which are representative of $\sin \Delta\phi$ and $\cos \Delta\phi$, and the output circuit 22 forms the ratio between said signals.

What is claimed is:

1. A continuous wave obstacle detection radar system for use in aircraft, said system comprising means for generating an frequency modulated radio signal, an antenna coupled to said generating means for transmitting said radio signal toward an object to be detected, a first and second receiving antenna spaced from each other a given distance for receiving echo signals from the object, a first and second means, each coupled to said generating means and to a respective one of said receiving antennas, for producing a beat frequency signal between the transmitted radio signal and a signal received by the respective one of said receiving antennas, the frequency of said beat signals being representative of the relative velocity and the distance between said system and the object and the phase difference between said beat signals being representative of the bearing of the object, means for standardizing the amplitudes of said beat signals, means for deriving from at least one of said standardized amplitude signals a second signal indicative of the presence of an object within a predetermined distance from said system, said second signal having a frequency representative of said relative velocity between said system and the object, means for controlling the maximum frequency of said second signal, and means for analyzing the shape of the frequency spectrum envelope of said second signal to thereby produce an output signal indicative of the presence of an object within said predetermined distance.

* * * * *